S. KIDO.
APPARATUS FOR MIXING COTTON.
APPLICATION FILED AUG. 2, 1918.

1,346,828.

Patented July 20, 1920.
3 SHEETS—SHEET 1.

Inventor:
S. Kido.
By H. R. Kerslake
Atty.

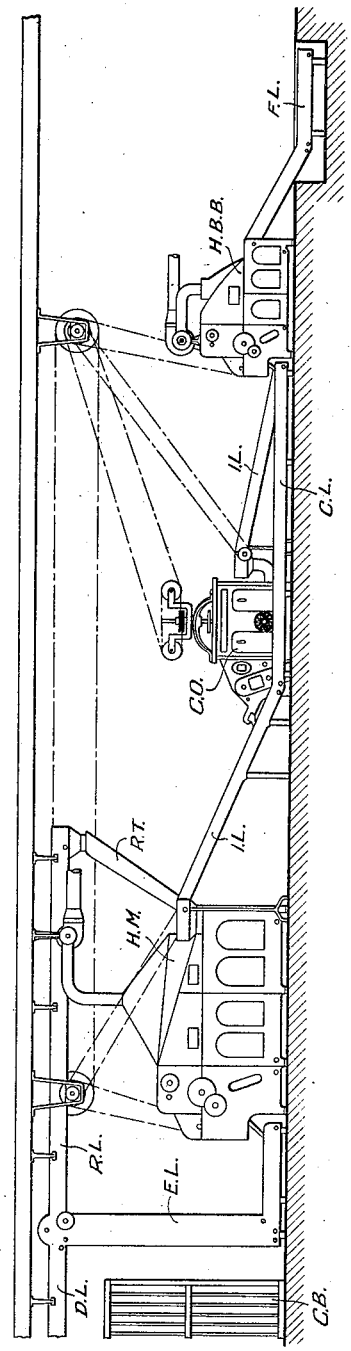
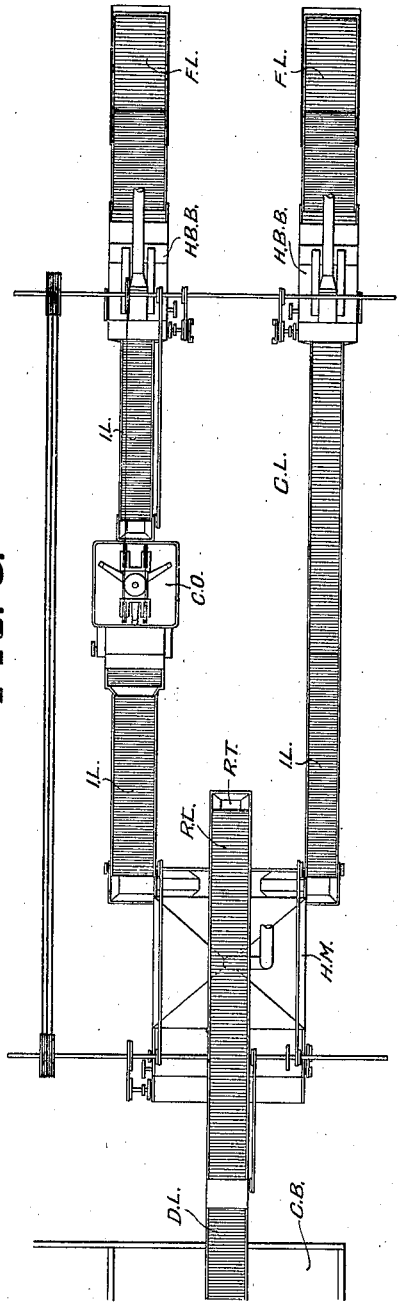

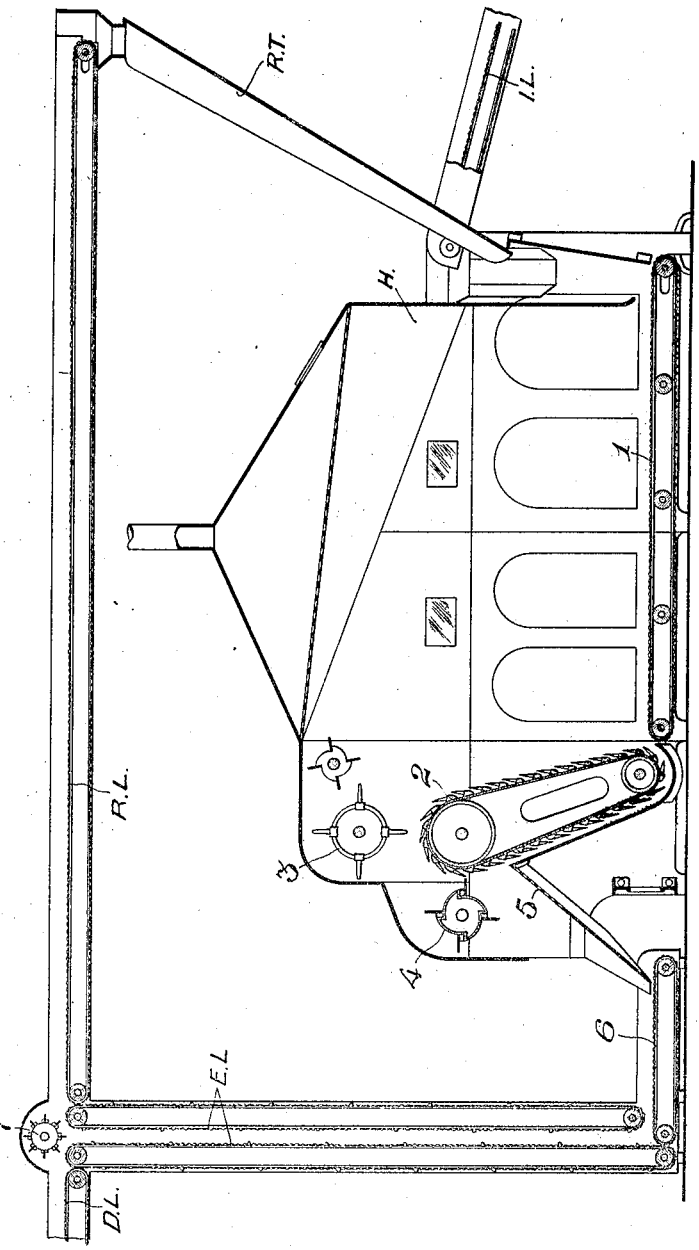

UNITED STATES PATENT OFFICE.

SUEKICHI KIDO, OF NISHISUMA, HYOGO-KEN, JAPAN, ASSIGNOR TO KANEGAFUCHI BOSEKI KABUSKIKI KWAISHA, OF MINAMIKATSUSHIKA-GUN, TOKYO-FU, JAPAN.

APPARATUS FOR MIXING COTTON.

1,346,828.　　　　　　Specification of Letters Patent.　　Patented July 20, 1920.

Application filed August 2, 1918. Serial No. 247,971.

*To all whom it may concern:*

Be it known that I, SUEKICHI KIDO, a subject of the Empire of Japan, residing at 18 Kamihamada, Nishisuma, Suma-Machi, Muko-Gun, Hyogo-Ken, Japan, have invented certain new and useful Improvements in Apparatus for Mixing Cotton, of which the following is a specification.

My invention relates to a method of and apparatus for mixing cotton, wherein a special mixer of continuous feeding and delivering system having a capacity large enough to take in all the quantity of cotton to be mixed at one operation, is provided in the course of mixing, and a conversible conveying device is connected to the mixer, whereby the cotton is continually fed and delivered, and all the quantity of cotton delivered successively or simultaneously from the bale breaker or opener into the mixer is repeatedly operated in and circulated through the mixer by means of said conveying device for a suitable time, and the cotton after being thus uniformly mixed, is delivered to the next process.

The object of this invention is to render the mixture quite uniform, and consequently, to produce best yarns and also to increase the amount of production.

In common methods, cotton is mixed by hand work previous to its opening process, otherwise the cotton delivered from the bale breaker or opener is piled up into a stack in horizontal layers in a cotton bin, and is, by some means, taken away from the stack in vertical sections for subsequent process.

According to these methods, the cotton simultaneously passing through the same machine or placed at the same section of stack may be mixed, but the cotton passing separately through the same machine or placed at different sections of the stack has no chance of being mixed.

Taking this into consideration, the inventor provides in the present invention a special mixer, entitled "hopper mixer", having a capacity large enough to take in all the quantity of cotton to be mixed at one operation, and the cotton accumulated in the hopper of the mixer is repeatedly operated in and circulated through the same by means of a conversible conveying device, the unopened pieces operated by a spiked roller of the mixer being thrown back into the hopper, while the opened pieces delivered from the mixer and carried by the conveying device are returned and charged again into the hopper, so that the said pieces become mingled together in the hopper with the cotton still remaining therein, and these operations are to be repeated over.

Thus, the inventor devised the method of mixing cotton uniformly, and according to this method, labor can greatly be saved, and also a large quantity of cotton can be mixed uniformly and simultaneously, with the result that best yarns with increased production are obtained.

The accompanying drawings show an apparatus for carrying out the present method of mixing cotton, in which:—

Fig. 2 is the side elevation thereof;

Fig. 3 is the plan view of the same; and

Fig. 4 is a longitudinal section of the "hopper mixer" peculiar in this invention, with the conversible conveying device connected thereto.

Figure 1:
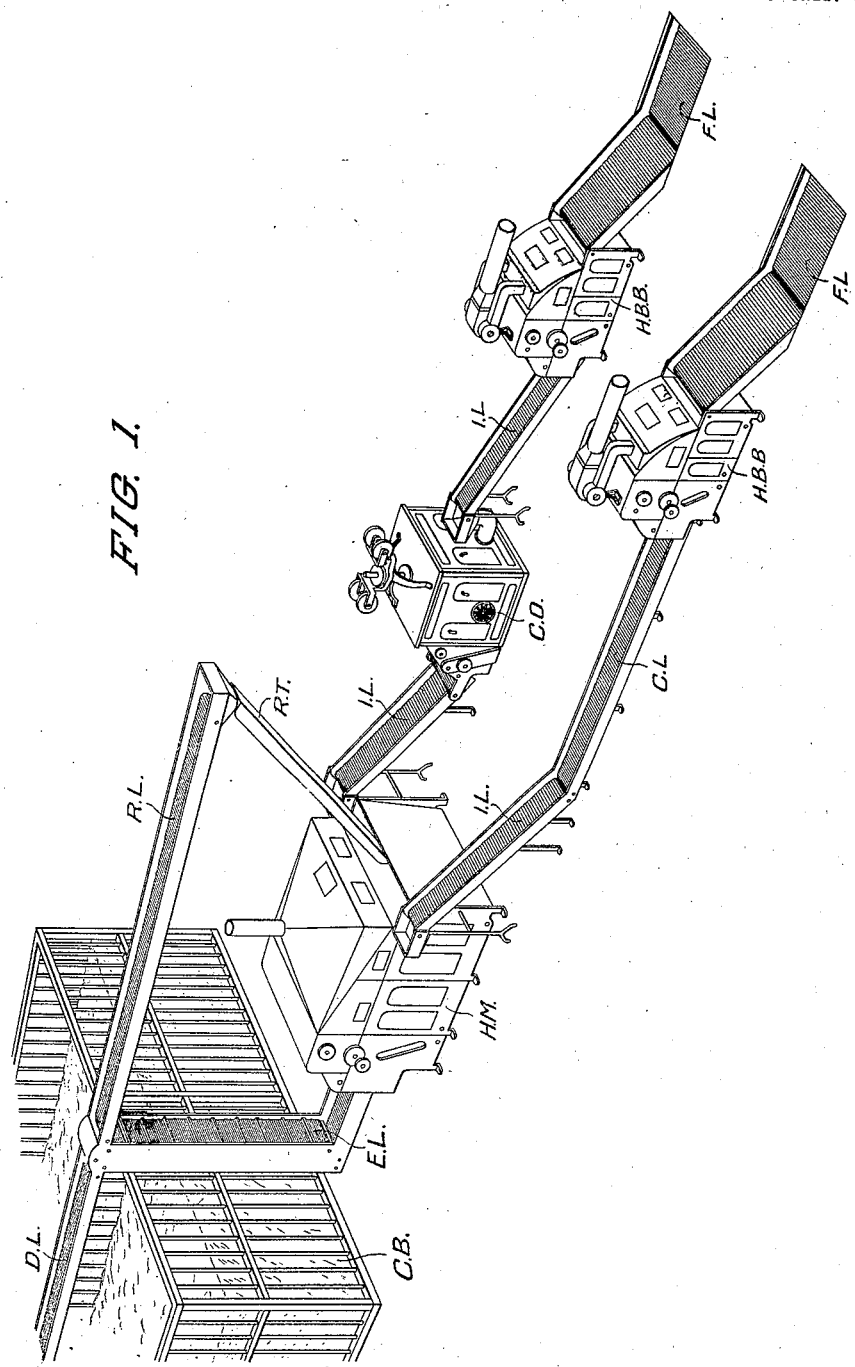
Figure 1 is a perspective view showing the whole arrangement of the apparatus.

Referring to Figs. 1 to 3, F. L. is the feed lattice, H. B. B. the hopper bale breaker, C. L. the creeper lattice, I. L. the inclined lattice, C. O. the Crighton opener, E. L. the elevating lattice, R. L. the return lattice, R. T. the return trough, D. L. the delivery lattice, C. B. the cotton bin, and H. M. is the special mixer of continuous feeding and delivering system having a capacity large enough to take in all the quantity of cotton to be mixed at one operation, entitled "hopper mixer" in this invention.

As shown in Fig. 4, the hopper mixer is similar to the hopper bale breaker in construction and operation, but its capacity is several times as large as the hopper bale breaker.

In the hopper mixer, H. is the hopper, 1 the feed lattice, 2 the inclined lattice or spiked lattice, 3 the spiked roller or evener roller, 4 the stripping roller or beater, 5 the grid, and 6 is the delivery lattice, all of which being respectively the same with the corresponding parts in the hopper bale breaker.

The elevating lattice E. L. consisting of a pair of lattices suspended vertically and made to revolve in the direction opposite to each other so as to elevate cotton inserted between them, is arranged to connect with both the return lattice R. L. and delivery lattice D. L., and the return lattice R. L. is arranged to communicate through the return trough R. T. with the feed lattice 1 of the hopper mixer, while the delivery lattice D. L. is arranged above the cotton bin C. B. A spiked roller 7 conversible in its revolving direction is arranged right over the elevating lattice E. L.

In carrying the method of mixing cotton into effect, the apparatus mentioned above is to be operated as follows:—All the quantity of cotton to be mixed at one operation is fed into the hopper bale breaker H. B. B., and the cotton being opened and loosened therein is charged through the creeper lattice C. L. directly into the hopper mixer H. M., or, a certain kind of cotton, in case of necessity, is charged through the inclined lattice I. L. first into the Crighton opener, and then into the hopper mixer, or, different kinds of cotton are, each in due proportion, simultaneously fed into a series of the hopper bale breaker and Crighton opener, and after that the cotton is accumulated into the hopper mixer. When the hopper mixer has been filled up with the cotton, the feeding is stopped, and then the return lattice R. L. in the conveying device is operated and the spiked roller 7 is revolved in the counter-clockwise direction, and the hopper mixed is started to work. Now, the cotton accumulated in the hopper H. of the hopper mixer is carried forward by the feed lattice 1 and is then carried upward by the spiked lattice 2, and any large or unopened pieces are thrown back into the hopper H. under the combing action of the spiked roller 3, while the opened pieces after passing through the spiked roller are stripped off the spiked lattice 2 by the beater 4 and fall on the grid 5. The said opened pieces are conveyed by the delivery lattice 6 and are delivered to and elevated by the elevating lattice E. L., and after passing through the return lattice R. L. and return trough R. T. it is charged into the hopper mixer, where it becomes mingled together with both of the said unopened pieces thrown back therein and the cotton still remaining in the hopper.

When this state of operation is repeated over for a suitable time, the cotton remaining in the hopper, the cotton returning again into the same and the cotton falling back thereto, are mixed together, and so the mixture of the whole is uniformly effected. At this occasion, the condition under which the cotton is conveyed is converted, that is, the return lattice R. L. is stopped, the delivery lattice D. L. is operated and the revolving direction of the spiked roller 7 is converted, then the cotton elevated by the elevating lattice E. L. is conveyed by the delivery lattice D. L. to be charged into the cotton bin C. B., thus one operation of mixing cotton is finished.

In the illustration of the present method in the drawings, the hopper mixer provided with two feeding passages is connected on one side to a hopper bale breaker, and on the other side to a Crighton opener from another hopper bale breaker, and this arrangement is suited in case different kinds of cotton are simultaneously supplied, for instance, American cotton from one side and Indian cotton from the other. According to circumstances, however, the hopper mixer may be connected to a hopper bale breaker only, or to one or more series of the feeding device, having a bale breaker or opener of same or different kinds and suitable for different properties of cotton. Toward the delivery of the hopper mixer is shown in the drawings a cotton bin, into which the cotton delivered from the hopper mixer is finally charged by means of the delivery lattice. But, the cotton bin may be dispensed with, and the cotton can be conveyed directly to the next process, such as the hopper feeder.

I claim:—

In an apparatus for mixing cotton, in combination, a relatively large hopper mixer, conveyers leading to and from the mixer, coacting elevating conveyers associated with the conveyer which leads from the mixer, a delivering conveyer leading from the elevating conveyers, a return conveyer associated with the elevating conveyers and extending over the mixer in a direction opposite to the direction assumed by the delivering conveyer, a return trough between the return conveyer and the inlet of the mixer, and a reversible roller above the upper ends of the elevating conveyers for insuring of the passage of cotton on to the delivering conveyer or on to the return conveyer, substantially as described.

In testimony whereof I have affixed my signature in presence of two witnesses.

SUEKICHI KIDO.

Witnesses:
　W. EBIHARAH,
　K. TAKASHIMA.